(12) United States Patent
Chamayou et al.

(10) Patent No.: US 8,497,346 B2
(45) Date of Patent: Jul. 30, 2013

(54) POLYMER POWDER STORAGE AND/OR TRANSPORT AND/OR DEGASSING VESSELS

(75) Inventors: Jean-Louis Chamayou, Carry le Rouet (FR); Kevin Peter Ramsay, Livingston (GB)

(73) Assignee: Ineos Commercial Services UK Limited, Hampshire (GB)

( * ) Notice: Subject to any disclaimer, the term of this patent is extended or adjusted under 35 U.S.C. 154(b) by 0 days.

(21) Appl. No.: 13/518,545

(22) PCT Filed: Dec. 24, 2010

(86) PCT No.: PCT/EP2010/070727
§ 371 (c)(1),
(2), (4) Date: Jun. 22, 2012

(87) PCT Pub. No.: WO2011/085937
PCT Pub. Date: Jul. 21, 2011

(65) Prior Publication Data
US 2012/0259085 A1 Oct. 11, 2012

(30) Foreign Application Priority Data

Jan. 13, 2010 (EP) .................................. 10150650

(51) Int. Cl.
*C08G 64/00* (2006.01)
*C08G 63/02* (2006.01)

(52) U.S. Cl.
USPC ............. 528/502; 422/131; 422/135; 526/67; 526/88; 526/352

(58) Field of Classification Search
USPC ............... 422/131, 135, 243; 526/67, 88, 352
See application file for complete search history.

(56) References Cited

U.S. PATENT DOCUMENTS

| | | |
|---|---|---|
| 5,292,863 A | 3/1994 | Wang |
| 5,478,922 A | 12/1995 | Rhee et al. |
| 5,688,910 A | 11/1997 | Wang |
| 5,799,412 A | 9/1998 | Yamamoto et al. |
| 7,807,761 B2 * | 10/2010 | Chamayou et al. ............. 526/88 |

* cited by examiner

*Primary Examiner* — Terressa Boykin
(74) *Attorney, Agent, or Firm* — Nixon & Vanderhye

(57) ABSTRACT

Polymer powder vessel having a silo including a main vertical cylinder and a hopper at the bottom of the cylinder, a polymer powder which occupies the full volume of the hopper and at least a part of the volume of the cylinder, a polymer powder silo inlet pipe connected to the silo at a height located above the polymer powder, and a polymer hopper withdrawal pipe is also connected to the hopper. The polymer powder hopper withdrawal pipe is also connected to the silo at a location above the polymer powder for recirculating a part of the polymer powder within the silo.

38 Claims, 2 Drawing Sheets

POLYMER POWDER STORAGE AND/OR TRANSPORT AND/OR DEGASSING VESSELS

This application is the U.S. national phase of International Application No. PCT/EP2010/070727 filed 24 Dec. 2010 which designated the U.S. and claims priority to European Application No. 10150650.9 filed 13 Jan. 2010, the entire contents of each of which are hereby incorporated by reference.

The present invention relates to a polymer powder vessel, preferably a polymer powder storage and/or transport and/or degassing vessel.

The present invention also relates to a process for operating a polymer powder vessel, preferably a polymer powder storage and/or transport and/or degassing vessel.

BACKGROUND OF THE INVENTION

Polymer powder storage and/or transport and/or degassing vessels have been extensively used in polymer production plants. Bulk material is frequently stored and/or transported in hoppers and silos. The discharge, transport and/or emptying of such hoppers and silos can cause troubles. On the market, different discharge pads are offered, e.g. bin discharger and vibrating bin dischargers as well as aeration nozzles.

In the course of the development of their polymer powder degassing process, the Applicants have experienced regular powder flowability problems, especially with some particular polymer powders, that could not be solved by the known techniques. It is therefore an objective of the present invention to provide an improved polymer powder degassing and/or storage and/or transport vessel that would mitigate and potentially solve these operability problems that could not be solved by the conventional methods.

SUMMARY OF THE INVENTION

The present invention relates to a polymer powder vessel comprising:
 a silo comprising a main vertical cylinder and a hopper at the bottom of the cylinder,
 a polymer powder which occupies the full volume of the hopper and at least a part of the volume of the cylinder,
 a polymer powder silo inlet pipe connected to the sito at a height located above the polymer powder, preferably connected to the top of the silo, and
 a polymer powder hopper withdrawal pipe connected to the hopper, preferably connected to the bottom of the hopper,
characterised in that the polymer powder hopper withdrawal pipe is also connected to the silo at a location above the polymer powder for recirculating a part of the polymer powder within the silo.

The present invention also relates to a process for operating a polymer powder vessel which comprises
 a silo comprising a main vertical cylinder and a hopper at the bottom of the cylinder,
 a polymer powder which occupies the full volume of the hopper and at least a part of the volume of the cylinder,
 a polymer powder silo inlet pipe connected to the silo at a height located above the polymer powder, preferably connected to the top of the silo, and
 a polymer powder hopper withdrawal pipe connected to the hopper, preferably connected to the bottom of the hopper,
characterised in that at least a part of the polymer powder which is withdrawn from the hopper is recirculated via the polymer powder hopper withdrawal pipe to a location upstream of the silo or to the silo at a height located above the polymer powder, preferably located at the top of the silo.

According to the process or polymer powder vessel of the present invention, the average ("mean") particle size of the polymer powder is preferably lower than 2000, preferably comprised between 200 and 1800, more preferably comprised between 500 and 900 microns. Any conventional means for example a Malvern or a mesh sieving technique can be used to measure the average ("mean") particle size of the polymer powder. For the purposes of the present invention and appended claims, the measurement of the average ("mean") particle size was made according to the ASTM-D-1921 sieving technique (Test Method A).

Additionally, according to the process or polymer powder vessel of the present invention, the polymer powder is preferably a virgin polymer powder, i.e. a powder which does not contain any additives, e.g. additives like antioxidants and stabilizers.

The polymer powder silo is usually either a polymer powder storage and/or a transport and/or a degassing vessel, preferably a polymer powder degasser vessel.

This means that the present invention is particularly applicable when the polymer powder is subsequently subjected to an extrusion process after having been stored and/or transported and/or preferably degassed according to the present invention.

These polymer powder degasser vessels are well known by the man skilled in the art. Examples thereof can be found in e.g. EP683176, EP596434 and U.S. Pat. No. 5,376,742.

It can be e.g. a primary degasser, secondary degasser, combined degasser or final degasser (also well known as polisher). The primary degasser (sometimes referred as a flasher) usually operates by depressurising the polymer powder which comes from the polymerisation reactor; this can be done with or without the use of a sweep gas. Indeed gas sweeping is not mandatory in this first stage flasher which main objective is the gas solid separation. For example, EP 127253 describes a process for the removal of residual monomers from ethylene copolymers by subjecting the copolymer to a reduced pressure zone sufficient to desorb the monomer, sweeping the copolymer with reactor gas which is free of inert gases and recycling the resultant gas containing the desorbed monomer to the polymerisation zone. The secondary degasser usually operates by stripping the polymer powder coming from the primary degasser with a stripping gas introduced at the bottom of the degasser silo. U.S. Pat. No. 4,372,758, for example, describes a degassing process which uses an inert gas such as nitrogen for the removal of unreacted gaseous monomer from the polymer product. Solid polymer is conveyed to the top of a purge vessel by means of an inert gas system, an inert gas stream is introduced into the bottom of the purge vessel and the solid polymer is counter currently contacted with the inert gas stream to remove the unreacted gaseous monomers from the solid polymer product. The unreacted monomers and the stripping inert gas stream are often passed to a flare for disposal or vented to the atmosphere. The combined degasser is usually a combination of the primary and secondary degasser. Such a combined degasser vessel would normally have a first degassing section located in an upper section, and polymer from the first degassing step would fall by gravity into the second degassing section located below. Finally, the polisher or final degassing column is usually a countercurrent degasser wherein the polymer powder flows downwards by gravity and a stripping gas is injected at the bottom of the vessel via specifically designed gas distributors. The stripping gas must be very pure since this is the final degassing step; pure nitrogen is therefore often used. Depending on the catalyst system used during the upstream polymerization process, a deactivation agent (e.g. steam and/or oxygen) may also be injected to deactivate the catalyst and cocatalyst residues.

The total residence time of the polymer powder in the primary degasser is usually around 45 seconds to 5 minutes. The total residence time of the polymer powder in either the secondary or combined degasser and final degasser is preferably between 0.5 and 3 hours. For surge vessels, said residence time can even be comprised between 1.5 and 10 hours.

The volume of the silo is usually comprised between 3 and 200 cubic meters. For example, a primary degasser has usually a volume comprised between 3 to 10 cubic meters. For secondary, combined or final degassers, the volume can usually be comprised between 20 and 200 cubic meters.

The exact design of the silo, i.e. a structure for storing bulk materials, is important if the required flow pattern of the polymer powder inside the silo is a mass flow pattern. The man skilled in the art knows how to design said silos. The silo according to the present invention comprises a vertical cylinder and a hopper at the bottom of said vertical cylinder. The hopper is preferably an inverted right circular cone shape with walls which are sufficiently steep and/or smooth to satisfy the mass flow pattern requirement of the polymer powder; and which preferably ends with an opening at its lower part. The upper cylindrical perimeter of the hopper preferably coincides with the bottom perimeter of the silo. Some silo designs, in particular the one applicable to the polisher silo, also comprise an additional larger cylindrical head at the top of the cylinder, the connection between the cylindrical head and the main cylinder is usually of a conical shape. The silo may also comprise a dome at the top of its vertical cylinder. Preferably, the volume of the cylinder represents more than 50%, preferably more than 75%, for example more than 80% of the total volume of the silo.

According to the present invention, the polymer powder which comes preferably from the polymerisation reactor is introduced into the silo via a polymer powder inlet pipe which is preferably connected to the top of the silo.

This polymer powder silo inlet pipe is always connected to the silo at a height located above the surface of the polymer powder inside the silo; it is preferably connected to the top or the dome of the silo roof and more preferably to the centre of this top or dome.

According to the present invention, the polymer powder is withdrawn from the silo via a polymer powder hopper withdrawal pipe which is preferably connected to the bottom of the hopper. This polymer powder withdrawal pipe is preferably connected to the base of the cone of the hopper and preferably to the centre of the cone of the hopper; the diameter of this pipe is chosen to ensure the powder mass flow in the silo and to minimise the risk of stable arch formation in the cone of the hopper. There can be one or more polymer withdrawal pipes as long as at least one of the polymer withdrawal pipe is connected to a location upstream of the silo or to the silo at a location (height) above the polymer powder for recirculating a part of the polymer powder; for example, in an embodiment of the present invention, there is one polymer withdrawal pipe connected to the base of the cone and a second polymer withdrawal pipe connected to a higher elevation of the cone, said second polymer withdrawal pipe being preferably used exclusively for the recirculation of part of the powder. According to a preferred embodiment of the present invention, the polymer powder withdrawal pipe can be divided into a main polymer powder withdrawal pipe and one secondary polymer powder diversion pipe, i.e. the polymer powder recirculation pipe. Said polymer powder recirculation pipe is thus then connected to the silo as previously described, i.e. at a point located above the polymer powder, preferably located at the top of the silo. Thus, when the recirculation pipe is connected to the silo, this is always above the top level of the powder inside the silo either via an independent powder inlet nozzle or directly connected to the main polymer powder inlet pipe as defined hereinabove.

In this preferred embodiment, the separation between the main polymer powder withdrawal line and the polymer powder recirculation line can be made by any appropriate means, e.g. via a diverter valve. The polymer powder recirculation line is preferably connected to a nitrogen pneumatic transport device which facilities the recirculation of the powder to the top of the silo.

The Applicants have unexpectedly found the advantages associated with the present invention in the course of the development of their degassing process when handling polymer powder showing flowability problems. Therefore, whilst the vessel and process of the present invention may be used with any polymer powder, even those that are generally considered as "free-flowing" or "easy-flowing", the present invention applies particularly to polymer powders with relatively poor flow properties.

Powder flow properties are typically characterised by testing in a shear cell. An example of such a test is described in ASTM D 6773-02 "Standard Shear Test Method for Bulk Solids Using the Schulze Ring Shear Tester". As described in ASTM D 6773-02, the flow function of a polymer powder is a plot of the unconfined yield strength of the powder versus major consolidation stress. In general, polymers are rated in their flowability in terms of the flowability ratio, ffc, which is defined as the ratio of the consolidation stress to the unconfined yield strength, as follows:

| | |
|---|---|
| ffc < 1 | non-flowing |
| 1 < ffc < 2 | very cohesive (to non-flowing) |
| 2 < ffc < 4 | cohesive |
| 4 < ffc < 10 | easy-flowing |
| 10 < ffc | free-flowing. |

The present invention is particularly applicable to polymer powders with a value of ffc less than 4, although it may also be useful even for polymer powders with values above 4.

Preferably, therefore, the polymer powder of the present invention has a flowability ratio of less than 6. More preferably, the polymer powder of the present invention has a flowability ratio of less than 4, and most preferably has a flowability ratio of less than 2. Preferably, the polymer powder of the present invention has a flowability ratio of at least 1. It should be noted that the flowability ratio of a polymer powder may change as a function of the consolidation pressure and also of temperature. As used herein, the flowability ratio of the polymer powder is the value measured using the instantaneous shear test described in ASTM D 6773-02 at a consolidation pressure of 2000 Pa and at a temperature that is equal to the temperature of the polymer powder at the base of the bottom cone of the silo where the recirculation will be implemented. For example, the flowability ratio of the polymer powder can be measured at a temperature of the polyethylene powder of 65° C.

When the process according to the present invention is applied to a polymer powder degassing vessel, said polymer powder contains hydrocarbons residues coming from the upstream polymerisation process and/or upstream polymer degassing stage. The hydrocarbon content of the polymer powder after treatment in a degasser silo is the residual hydrocarbons content. As used herein "residual hydrocarbons" are hydrocarbons that are absorbed on the polymer. Such components do not form part of the chemical structure of the polymer powder and are removable by degassing. Residual hydrocarbons will include alkanes, as well as comonomers and principle monomer that have not reacted in the polymerisation reaction. Typically, the polymer powder introduced into the silo according to the present invention comprises residual hydrocarbons in an amount of 0.01 to 25% by weight of the one or more hydrocarbons having 3 to 10 carbon atoms, for example 0.05 to 10% by weight. The residual hydrocarbon content of the critical hydrocarbon component in a polymer powder is suitably measured by multiple head space analysis of a sample of the polymer.

Head space analysis is a known technique for measuring the volatile components present in a sample. A number of commercially available analysis systems are available, for example Turbomatrix HS-40, available from Perkin Elmer Life and Analytical Sciences, Shelton, Conn., United States.

In the present invention, the residual hydrocarbon content has been measured on a Perkin Elmer Turbomatrix HS-40 with a 0.4 g sample held in a 22 ml sample vial maintained at 100° C., and equipped with a gas chromatograph (GC) with FID detector, for analysis of the extracted samples.

The sample in the vial is pressured to 20 psi with nitrogen carrier gas. The head space is then extracted and transferred to the gas chromatograph for analysis.

The process of pressurisation/extraction should be repeated 9 times (multiple head space extraction), and the results totaled for each component identified by the GC to provide the residual hydrocarbon content for each hydrocarbon component of interest.

Whilst not wishing to be bound by this theory, the Applicants believe that the process of the present invention improves the overall degassing process efficiency by further reducing the residual hydrocarbon content.

The present invention has proven to be particularly beneficial to silos which contain at least 20 cubic meters of polymer powder. Also, the present invention has proven to be particularly beneficial when the recirculation rate of the polymer powder is preferably comprised between 1 and 30, preferably between 5 and 20 percent per hour of the polymer powder present in the silo, more preferably between 8 and 16 percent per hour. Also, the present invention has proven to be particularly beneficial when the polymer powder occupies at least half of the volume of the silo.

The process according to the present invention has also proven to be particularly beneficial when operability problems were encountered in the course of their continuous polymerisation process operations. Indeed, in the event of downstream problems (e.g. shut down of the polymer powder extruder for example for knifes replacement) the polymer powder withdrawal from the vessels located upstream of the extruder has to be stopped; similarly, the same type of problem may occur if the polymer powder which is withdrawn from the polymer powder degasser vessel is not sufficiently degassed (e.g. due to a temporary loss of the gas stripping flow). This could lead to the formation a stable arch during consolidation at rest, especially during the manufacture of product of poor flowability as defined above. It has been found that the present invention, allowing to maintain the powder in movement thanks to the recirculation flow, prevents the formation of such stable arches and therefore avoids severe manufacturing issues due to vessel blockages.

A characterising feature according to the present invention is that at least part of the polymer powder which is withdrawn from the hopper is recirculated via the polymer powder hopper withdrawal pipe to the silo at a point located above the polymer powder. If several silos are used in series, it will be obvious for the man skilled in the art that what is critical is that recirculation and continuous movement of the polymer powder takes place within the silo; therefore, according to an embodiment of the present invention, the reintroduction of the polymer powder can also be done at any point upstream of the silo from which it is withdrawn, e.g. in another silo located upstream, as long as the said polymer powder is recirculated into the downstream silo.

The method is preferably applied to a continuous process in particular wherein the degassing stage takes place downstream of a continuous polymerization reaction process. In this configuration, the silo according to the present invention is thus located downstream of the polymerization reactor and upstream of the polymer powder extruder. Said polymerization reaction can take place in any appropriate reactor, e.g. a gas phase reactor, a gas/liquid phase reactor or a slurry reactor.

When the olefin polymerisation reaction is in slurry phase, the reactor is preferably a slurry loop reactor. Slurry phase polymerisation of olefins is well known wherein an olefin monomer and optionally olefin comonomer are polymerised in the presence of a catalyst in a diluent in which the solid polymer product is suspended and transported. Liquid full loop reactors are particularly well known in the art and are described for example in U.S. Pat. Nos. 3,152,872, 3,242,150 and 4,613,484. Polymerisation is typically carried out at temperatures in the range 50-125 degrees C. and at pressures in the range 1-100 bara. The catalyst used can be any catalyst typically used for olefin polymerisation such as chromium oxide, Ziegler-Natta or metallocene-type catalysts. The product slurry comprising polymer and diluent, and in most cases catalyst, olefin monomer and comonomer can be discharged intermittently or continuously, optionally using concentrating devices such as hydrocyclones or settling legs to minimise the quantity of fluids withdrawn with the polymer.

The loop reactor is of a continuous tubular construction comprising at least two, for example four, vertical sections and at least two, for example four, horizontal sections. The heat of polymerisation is typically removed using indirect exchange with a cooling medium, preferably water, in jackets surrounding at least part of the tubular loop reactor. The volume of the loop reactor can vary but is typically in the range 20 to 120 cubic meters.

When polymerization reaction is in the gas phase, the method may be carried out in a stirred and/or gas fluidised bed. Gas phase polymerisation of a polymerisable olefin or mixture thereof to produce normally solid polymer substances using a quench-cooled, gas-phase polymerisation reactor containing a sub-fluidised particulate bed of polymerised olefin has been described in a number of patents including: U.S. Pat. Nos. 3,957,448, 3,965,083 and 3,971,768. These US patents describe polymerisation processes and apparatus in which polymer is formed from gaseous olefin in horizontal stirred-bed vessels.

Preferably, the method of the present invention is carried out continuously in the gas phase in a fluidised-bed reactor. Such processes are well-known, and examples include EP 0 475 603, EP 1 240 217, EP 1 484 344 and EP 0 855 411.

In such processes, the particles of polymer being formed are maintained in the fluidised state by virtue of a reaction gas mixture containing the monomer(s) to be polymerised travelling in a rising stream. The polymer thus manufactured in powder form is generally drained from the reactor in order to keep the bed of fluidised polymer particles at a more or less constant volume. The process generally employs a fluidisation grid which distributes the reaction gas mixture through the bed of polymer particles and which acts as a support for the bed in the event of a cut in the flow of the rising gas. The reaction gas mixture leaving at the top of the fluidised-bed reactor is recycled to the base of the latter under the fluidisation grid by means of an external circulation conduit.

The polymerisation of the olefins is an exothermic reaction. The reaction mixture comprising the olefins to be polymerised is generally cooled by means of at least one heat exchanger arranged on the outside of the reactor before being recycled. Liquid, especially but not limited to liquid condensed from the cooled reaction mixture during recycle, may be injected into the reaction zone. Vaporisation of the liquid in the reaction zone provides the effect of cooling directly in the reaction zone.

The method of the invention is particularly suitable for very large industrial reactors; in accordance with one embodiment of the present invention, the reactor used makes it possible to produce quantities of polymer of more than 3000 kg/h, preferably more than 10,000 kg/h. The process of the invention is further particularly suitable for high production rates (i.e. the space time yield in tetras of weight of polymer produced per unit volume of reactor space per unit time) in commercial gas fluidised bed reactors; consequently, according to a further embodiment of the present invention, space time yields are higher than 25 kg/m$^3$/h, preferably higher than 50 kg/m$^3$/h, more preferably higher than 80 kg/m$^3$/h.

The principal olefin is preferably selected from olefins having 2 to 6 carbon atoms such as ethylene, propylene, 1-butene, 1-hexene and 4-methyl-1-pentene, and more preferably is ethylene or propylene.

Comonomer olefins, where present, are preferably selected from olefins having 2 to 12 carbon atoms. Suitable comonomer olefins are ethylene, propylene, 1-butene, 1-hexene, 4-methyl-1-pentene and 1-octene. Preferably, the principal olefin is ethylene or propylene and the comonomer is ethylene, propylene, 1-butene, 1-hexene or 1-octene. More preferably, the olefin is ethylene and the comonomer is 1-butene, 1-hexene or 1-octene, preferably 1-hexene or 1-octene.

The reaction mixture may also comprise one or more inert compounds, especially inert gases such as nitrogen, and/or one or more saturated hydrocarbons such as ethane, propane, butane, pentane and hexane.

The method according to the present invention may be used to prepare a wide variety of polymer products, preferably polyethylene or polypropylene. Polyethylenes are the preferred products, and the most preferred product is linear low density polyethylene (LLDPE), especially based on copolymers of ethylene with 1-butene, 1-hexene or 1-octene. This method is particularly suitable for the production of very low density polyethylene (VLDPE). A further suitable polyethylene product is high density polyethylene (HDPE), especially copolymers of ethylene with a small portion of higher alpha olefin, for example, 1-butene, 1-pentene, 1-hexene or 1-octene.

The method is particularly suitable for polymerising olefins in the gas phase at an absolute pressure of between 0.5 and 6 MPa and at a temperature of between 30° C. and 130° C. For example, for LLDPE production the temperature is suitably in the range 75-100° C. and for HDPE the temperature is typically 80-115° C. depending on the activity of the catalyst used and the polymer properties desired.

The total pressure in the gas phase polymerisation reactor is most preferably between 1.5 and 3 MPa.

The method of the present invention may be applied to polymerisation processes using any suitable polymerisation catalyst, including Ziegler-Natta type catalysts chromium oxide type catalysts, and metallocene type catalysts.

The copolymerisation may therefore be carried out, for example, in the presence of a catalyst of Ziegler-Natta type comprising at least one transition metal in combination with a cocatalyst comprising an organometallic compound, for example an organoaluminium compound. The catalyst essentially comprises an atom of a transition metal selected from the metals of groups IV to VI of the periodic classification of the elements, such as titanium, vanadium, chromium, zirconium or hafnium, optionally a magnesium atom and a halogen atom. The catalyst may be supported on a porous refractory oxide such as silica or alumina or may be combined with a solid magnesium compound, such as the chloride, the oxide, the hydroxy chloride or an alcoholate of magnesium. By way of example, mention may be made of the catalysts described in the patents U.S. Pat. No. 4,260,709, EP 0 598 094, EP 0 099 774 and EP 0 175 532. The present invention is also particularly appropriate for silica-supported Ziegler catalysts, for example those described in Patents WO 93/09147, WO 95/13873, WO 95/34380, WO 99/05187 and U.S. Pat. No. 6,140,264. The catalyst can be used as it is or optionally in the form of a coated catalyst or prepolymer containing, for example, from $10^{-5}$ to 3, preferably from $10^{-3}$ to $10^{-1}$, millimoles of transition metal per gram of polymer; it can be used together with a cocatalyst or activator, e.g. an organometallic compound of a metal from groups I to III of the Periodic Classification of the Elements, such as, for example, an organoaluminium compound. It is also possible to use a catalyst complexed by a metal selected from those of group VIII of the periodic classification of the elements, such as, for example, nickel, iron or cobalt. By way of examples, mention may be made of those described in Patent Application WO 98/27124 or WO 98/2638. It is also possible to use catalysts based on platinum or palladium as the transition metal; complexes of this type are described, for example, in the Patent WO 96/23010.

The copolymerisation may thus also be carried out in the presence of a chromium oxide catalyst. Examples of chromium oxide catalysts are typically those comprising a refractory oxide support which is activated by a heat treatment advantageously carried out at a temperature of at least 250° C. and at most equal to the temperature at which the granular support begins to sinter and under a non-reducing atmosphere and preferably an oxidising atmosphere. This catalyst can be obtained by a great number of known process, in particular by those according to which, in a first stage, a chromium compound, such as a chromium oxide, generally of formula CrO3, or a chromium compound which can be converted by calcination into chromium oxide, such as, for example, a chromium nitrate or sulphate, an ammonium chromate, a chromium carbonate, acetate or acetylacetonate, or a tert-butyl chromate, is combined with a granular support based on refractory oxide, such as, for example, silica, alumina, zirconium oxide, titanium oxide or a mixture of these oxides or aluminum or boron phosphates or mixtures in any proportion of these phosphates with the above mentioned oxides. In a second stage, the chromium compound thus combined with the granular support is subjected to a so-called activation operation by heat treatment in a non-reducing atmosphere and preferably an oxidising atmosphere at a temperature of at least 250° C. and at most that at which the granular support begins to sinter. The temperature of the heat treatment is generally between 250° C. and 1200° C. and preferably between 350 and 1000° C. Such catalyst preferably contains from 0.05 to 5%, more preferably from 0.1 to 2%, by weight of chromium; it can contain, in addition to the chromium, from 0.1 to 10% of titanium in the form of titanium oxide and/or fluorine and/or aluminum, in particular in the form of aluminum oxide; it can be used as it is or optionally in the form of a coated catalyst or prepolymer containing, for example, from $10^{-5}$ to 3, preferably from $10^{-3}$ to $10^{-1}$, millimoles of chromium per gram of polymer. The chromium oxide catalysts may be used together with a cocatalyst or activator, e.g. an organometallic compound of a metal from groups I to III of the Periodic Classification of the Elements, such as, for example, an organoaluminium compound. Examples of catalysts can be found, for example, in EP 0 275 675, EP 0 453 116, or WO 99/12978.

The method of the present invention is also preferably applied to a polymerisation process in which the catalyst is a metallocene-type catalyst. In particular, the present invention has been found to provide significant improvements when used for such systems.

With regards to particular metallocene-type catalysts, mention may be made, by way of example, of those corresponding to the formula:

[L]mM[A]n where L is a bulky ligand; A is a leaving group, M is a transition metal and m and n are such that the total valency of the ligand corresponds to the valency of the transition metal.

The ligands L and A may be bridged. L is generally a ligand of the cyclopentadienyl type.

Examples of metallocene catalysts of this type are described in U.S. Pat. Nos. 4,530,914, 5,124,418, 4,808,561, 4,897,455, 5,278,264, 5,278,119, 5,304,614, and EP 0 129 368, EP 0 591 756, EP 0 520 732, EP 0 420 436, WO 91/04257, WO 92/00333, WO 93/08221, WO 93/08199.

It is also possible to use with advantage the metallocene-based catalyst systems as described in U.S. Pat. Nos. 4,871,705, 4,937,299, 5,324,800, 5,017,714, 5,120,867, 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP 0 561 476, EP 0 279 586, EP 0 594 218, WO 94/10180 and WO 2006/085051.

Mention may also be made of the Patents WO 92/00333, WO 94/07928, WO 91/04257, WO 94/03506, U.S. Pat. Nos. 5,057,475, 5,096,867, 5,055,438, 5,198,401, 5,227,440, 5,264,405, EP-A-0 420 436, U.S. Pat. Nos. 5,604,802, 5,149,819, 5,243,001, 5,239,022, 5,276,208, 5,296,434, 5,321,106, 5,329,031, 5,304,614, WO 93/08221, WO 93/08199 and EP 0 578 838. The preferred transition metal compounds of the catalyst are those of group 4, in particular zirconium, titanium and hafnium.

The metallocene catalyst may also be represented by the general formula (Cp)m MRnR'p, where Cp is a ring of the cyclopentadienyl type, M is a transition metal of group 4, 5 or 6; R and R' may be selected from halogens and hydrocarbyl or hydrocarboxyl groups; m=1-3, n=0-3, p=0-3 and the sum m+n+p equals the oxidation state of M; preferably, m=2, n=1 and p=1.

The metallocene catalyst may be also represented by the general formula:

(C5 R'm)p R"s (C5 R'm) Me Q3-p-x, or

R"s (C5 R'm)2 MeQ' where Me is a transition metal of group 4, 5 or 6, at least one C5 R'm is a substituted cyclopentadienyl, each R', which may be identical or different, is hydrogen, an alkyl, alkenyl, aryl, alkylaryl or arylalkyl radical having 1 to 20 carbon atoms, or two carbon atoms linked together to form part of a substituted or unsubstituted ring having 4 to 20 carbon atoms, R" is a radical containing one or more or a combination of carbon, germanium, silicon, phosphorus or nitrogen atoms which bridges two rings (C5 R'm), or which bridges one ring (C5 R'm) to M, when p=0, x=1, else "x" is always 0, each Q, which may be identical or different, is an alkyl, alkenyl, aryl, alkylaryl or arylalkyl radical having 1 to 20 carbon atoms, a halogen or an alkoxide, Q' is an alkylidene radical having 1 to 20 carbon atoms, s is 0 or 1, and when s is 0, m is 5 and p is 0, 1 or 2 and when s is 1, m is 4 and p is 1.

The metallocene catalysts are generally used with an activator or cocatalyst. Examples which may be mentioned include alumoxane and/or ionic or neutral ionising activators, or compounds such as pentafluorophenyl tri(n-butyl)ammonium tetraborate or the boric metalloid precursor of trisperfluorophenyl, which ionises the neutral metallocene compound. Compounds of this type are described in EP 0 570 982, EP 0 520 732, EP 0 495 375, EP 0 426 637, EP 0 500 944, EP 0 277 003, EP 0 277 004, U.S. Pat. Nos. 5,153,157, 5,198,401, 5,066,741, 5,206,197 and 5,241,025, and WO 94/07928.

Catalyst combinations may also be used, for example those described in U.S. Pat. Nos. 5,281,679, 4,701,432, 5,124,418, 5,077,255 and 5,183,867.

Other examples of metallocene catalysts are described in Patents EP 0 593 083, U.S. Pat. Nos. 5,317,036, 4,937,217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706, WO 95/10542, WO 95/07939, WO 94/26793 and WO 95/12622.

Preferably, the metallocene comprises:
A) an inert support,
B) a group 4-10 metal complex corresponding to the formula:

where M is a metal of one of groups 4 to 10 of the Periodic Table of the Elements,
Cp is an anionic ligand group,
Z is a divalent moiety linked to Cp and linked to M, comprising boron or an element of group 14 of the Periodic Table of the Elements, and further comprising nitrogen, phosphorus, sulphur or oxygen;
X is a neutral conjugated diene ligand group having up to 60 atoms, or a dianionic derivative, and
C) an ionic cocatalyst capable of converting the metal complex into an active polymerisation catalyst.

Examples of cocatalysts are described in U.S. Pat. Nos. 5,132,380, 5,153,157, 5,064,802, 5,321,106, 5,721,185 and 5,350,723. Mention may also be made of the complexes described in WO 96/28480 and WO 98/27119.

The catalyst may be used in the form of a prepolymer prepared beforehand during a prepolymerisation step from catalysts described above. The prepolymerisation may be carried out by any process, for example a prepolymerisation in a liquid hydrocarbon or in gas phase in accordance with a batchwise, semicontinuous or continuous process.

The catalyst or the prepolymer may be introduced into the reactor continuously or discontinuously.

DETAILED DESCRIPTION OF THE INVENTION

Figure 1:
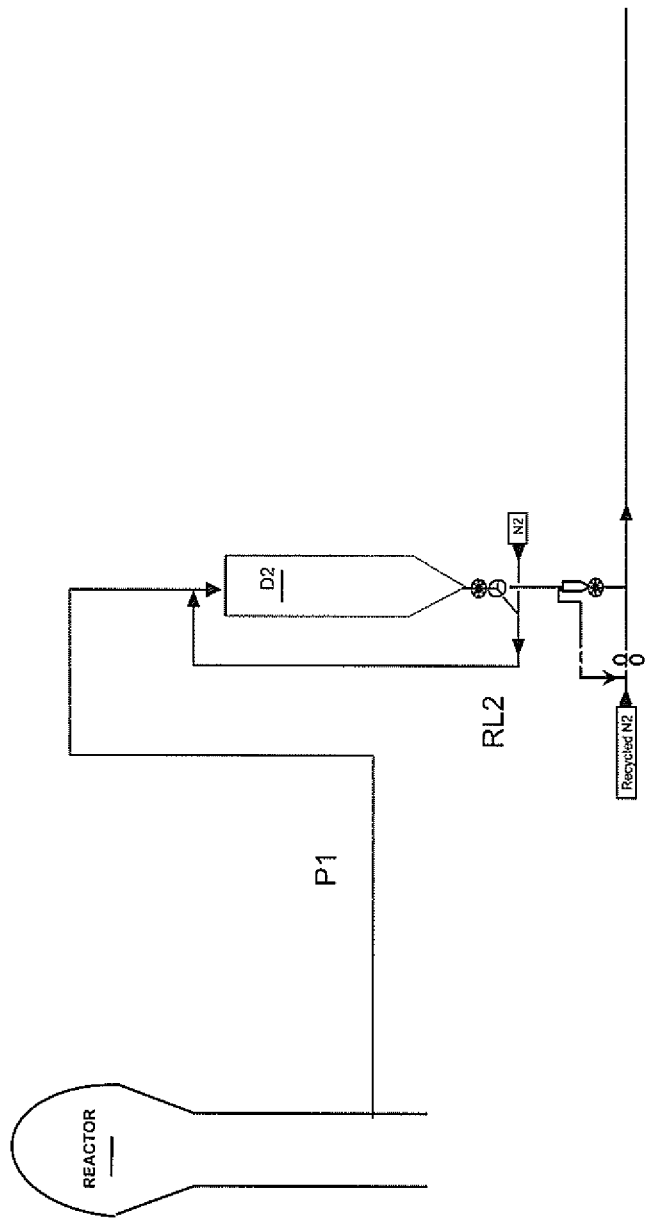
FIGS. 1 and 2 describe several process/apparatus configurations according to the present invention. D2 and D3 respectively represent a polymer powder degassing vessel.
Figure 2:
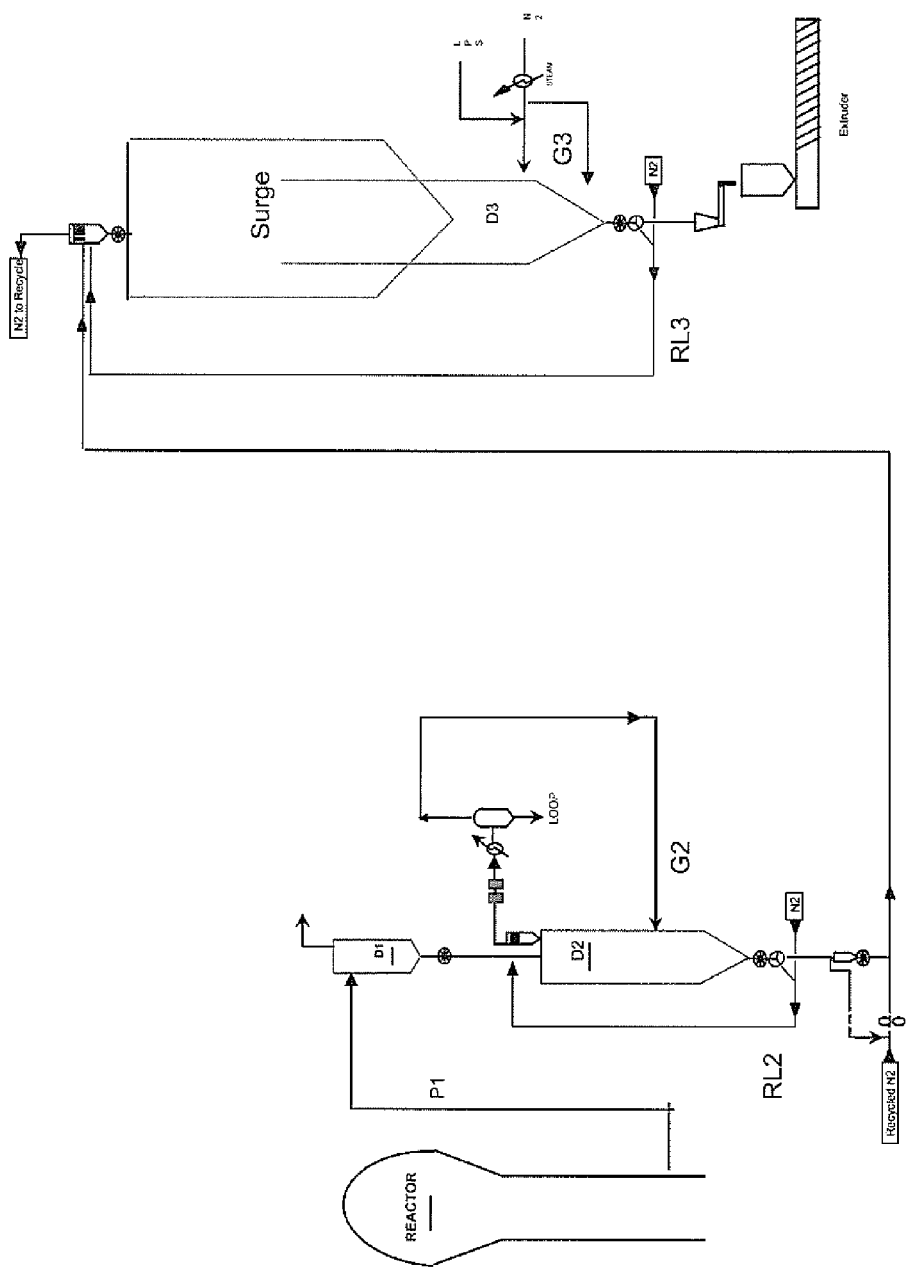

In its broadest aspect, an embodiment of the present invention is described in FIG. 1 or FIG. 2 wherein the polymer powder degasser vessel (D2 or D3)—comprising the polymer powder recirculation line (which can be RL2 or RL3)—is located downstream of the polymerization reactor and upstream of the polymer powder extruder wherein said powder is transformed into pellets.

In FIG. 1, the polymer powder P1 which is withdrawn from the fluidised bed gas phase polymerisation reactor is entered into the polymer powder degasser vessel D2.

In another embodiment, which is described in FIG. 2, the degassing line comprises two polymer powder degasser vessels in series (D2 and D3), both of which comprising their respective polymer powder recirculation line (RL2, RL3).

It will also be apparent from the FIG. 2 that RL3 represents a specific recirculation embodiment of the present invention wherein two silos (the polisher silo D3 and the surge silo) are used in series; indeed, the reintroduction of the polymer powder RL3 is done at any point upstream of the silo D3 from which it is withdrawn, i.e. in another silo (the surge silo) located upstream.

FIG. 2 also describes two additional embodiments of the present invention wherein the recirculation line RL2 is directly connected to the upper part of the silo D2 and wherein the recirculation line RL3 is connected upstream of the silo D3 via a bag filter.

FIG. 2 also describes an integrated process according to the present invention wherein a polymer powder is withdrawn from a polymerisation reactor, introduced into at least one degasser vessel and then introduced into an extruder wherein the powder is transformed into pellets; wherein the degasser vessel comprises the polymer powder recirculation concept of the present invention.

According to a particular embodiment, the degasser train described in FIG. 2 comprises a primary degasser (D1—also known as flasher), a secondary degasser (D2) and a polisher (D3) in series. FIG. 2 also describes the use of stripping gas (G2 and G3) for both D2 and D3. According to another embodiment not shown on the figure, the surge silo may also be integrated in parallel to the degasser train instead of being located in series; in this embodiment, the recirculation principle of the present invention is also preferentially applied to said surge silo which, for the purpose of the present invention and appended claims will be considered as a degasser vessel too.

The invention claimed is:

1. Polymer powder vessel comprising:
   a silo comprising a main vertical cylinder and a hopper at the bottom of the cylinder,
   a polymer powder which occupies the full volume of the hopper and at least a part of the volume of the cylinder,
   a polymer powder silo inlet pipe connected to the silo at a height located above the polymer powder, and
   a polymer powder hopper withdrawal pipe connected to the hopper,
   wherein the polymer powder hopper withdrawal pipe is also connected to the silo at a location above the polymer powder for recirculating a part of the polymer powder within the silo.

2. Polymer powder vessel according to claim 1 wherein the average ("mean") particle size of the polymer powder is lower than 2000 microns.

3. Polymer powder vessel according to claim 1 wherein the polymer powder flow properties are characterised by a flowability ratio of less than 6, as measured according to ASTM D 6773-02.

4. Polymer powder vessel according to claim 1 wherein the polymer powder which is introduced into the silo comprises residual hydrocarbons in an amount of 0.01 to 25% by weight, for example 0.05 to 10% by weight, of the one or more hydrocarbons having 3 to 10 carbon atoms.

5. Polymer powder vessel according to claim 1 wherein the polymer powder hopper withdrawal pipe is divided into a main polymer powder withdrawal pipe and at least one secondary polymer powder diversion pipe.

6. Polymer powder vessel according to claim 1 wherein the polymer powder vessel is a polymer powder degasser vessel.

7. Polymer powder vessel according to claim 1 wherein the silo contains at least 20 cubic meters of polymer powder.

8. Process for operating a polymer powder vessel which comprises
   a silo comprising a main vertical cylinder and a hopper at the bottom of the cylinder,
   a polymer powder which occupies the full volume of the hopper and at least a part of the volume of the cylinder,
   a polymer powder silo inlet pipe connected to the silo at a height located above the polymer powder, and
   a polymer powder hopper withdrawal pipe connected to the hopper,
   wherein at least a part of the polymer powder which is withdrawn from the hopper is recirculated via the polymer powder hopper withdrawal pipe to a location upstream of the silo or to the silo at a height located above the polymer powder.

9. Process according to claim 8 wherein the average ("mean") particle size of the polymer powder is lower than 2000 microns.

10. Process according to claim 8 wherein the polymer powder flow properties are characterised by a flowability ratio of less than 6, as measured according to ASTM D 6773-02.

11. Process according to claim 8 wherein the polymer powder which is introduced into the silo comprises residual hydrocarbons in an amount of 0.01 to 25% by weight of the one or more hydrocarbons having 3 to 10 carbon atoms.

12. Process according to claim 8 wherein the polymer powder hopper withdrawal pipe is divided into a main polymer powder withdrawal pipe and at least one secondary polymer powder diversion pipe.

13. Process according to claim 8 wherein the polymer powder vessel is a polymer powder degasser vessel.

14. Process according to claim 8 wherein the silo contains at least 20 cubic meters of polymer powder.

15. Process according to claim 8 wherein the recirculation rate of the polymer powder is comprised between 1 and 30 percent per hour of the polymer powder present in the silo.

16. Process for operating a polymer powder degasser vessel used in a continuous polymerisation process wherein
   said degassing vessel is located downstream of a polymerization reactor,
   said degassing vessel is located upstream of a polymer powder extruder, and
   said polymer powder extruder is shutting down, and
   wherein said degassing vessel further comprises
   a silo comprising a main vertical cylinder and a hopper at the bottom of the cylinder, a polymer powder which occupies the full volume of the hopper and at least a part of the volume of the cylinder, a polymer powder silo inlet pipe connected to the silo at a height located above the polymer powder, and a polymer powder hopper withdrawal pipe connected to the hopper, wherein at least a part of the polymer powder which is withdrawn from the hopper is recirculated via the polymer powder hopper withdrawal pipe to a location upstream of the silo or to the silo at a height located above the polymer powder.

17. Polymer powder vessel according to claim 1 wherein the polymer powder silo inlet pipe is connected to the top of the silo.

18. Polymer powder vessel according to claim 1 wherein the polymer powder hopper withdrawal pipe is connected to the bottom of the hopper.

19. Polymer powder vessel according to claim 2 wherein the average ("mean") particle size of the polymer powder is between 200 and 1800 microns.

20. Polymer powder vessel according to claim 2 wherein the average ("mean") particle size of the polymer powder is between 500 and 900 microns.

21. Polymer powder vessel according to claim 3 wherein the polymer powder flow properties are characterised by a flowability ratio of less than 4, as measured according to ASTM D 6773-02.

22. Polymer powder vessel according to claim 3 wherein the polymer powder flow properties are characterised by a flowability ratio of less than 2, as measured according to ASTM D 6773-02.

23. Polymer powder vessel according to claim 4 wherein the polymer powder which is introduced into the silo comprises residual hydrocarbons in an amount of 0.05 to 10% by weight of the one or more hydrocarbons having 3 to 10 carbon atoms.

24. Polymer powder vessel according to claim 5 wherein the at least one secondary polymer powder diversion pipe is the polymer powder recirculation pipe.

25. Process according to claim 8 wherein the polymer powder silo inlet pipe is connected to the top of the silo.

26. Process according to claim 8 wherein the polymer powder hopper withdrawal pipe is connected to the bottom of the hopper.

27. Process according to claim 8 wherein least a part of the polymer powder which is withdrawn from the hopper is recirculated via the polymer powder hopper withdrawal pipe to the top of the silo.

28. Process according to claim 9 wherein the average ("mean") particle size of the polymer powder is between 200 and 1800 microns.

29. Process according to claim 9 wherein the average ("mean") particle size of the polymer powder is between 500 and 900 microns.

30. Process according to claim 20 wherein the polymer powder flow properties are characterised by a flowability ratio of less than 4, as measured according to ASTM D 6773-02.

31. Process according to claim 10 wherein the polymer powder flow properties are characterised by a flowability ratio of less than 2, as measured according to ASTM D 6773-02.

32. Process according to claim 11 wherein the polymer powder which is introduced into the silo comprises residual hydrocarbons in an amount of 0.05 to 10% by weight of the one or more hydrocarbons having 3 to 10 carbon atoms.

33. Process according to claim 12 wherein the secondary polymer powder diversion pipe is the polymer powder recirculation pipe.

34. Process according to claim 15 wherein the recirculation rate of the polymer powder is comprised between 5 and 20 percent per hour of the polymer powder present in the silo.

35. Process according to claim 15 wherein the recirculation rate of the polymer powder is comprised between 8 and 16 percent per hour of the polymer powder present in the silo.

36. Process according to claim 16 wherein the polymer powder silo inlet pipe is connected to the top of the silo.

37. Process according to claim 16 wherein the polymer powder hopper withdrawal pipe is connected to the bottom of the hopper.

38. Process according to claim 16, wherein at least a part of the polymer powder which is withdrawn from the hopper is recirculated via the polymer powder hopper withdrawal pipe to the top of the silo.

* * * * *